United States Patent [19]

Tsutsumi et al.

[11] Patent Number: 4,657,076
[45] Date of Patent: Apr. 14, 1987

[54] CHEMICAL INJECTION TUBE MOUNTING STRUCTURE FOR GEOTHERMAL WELL

[75] Inventors: Jiro Tsutsumi, Iwate; Minolu Uchiyama, Morioka; Kunio Katagiri, Funabashi; Haruo Yamada, Morioka, all of Japan

[73] Assignee: Japan Metals and Chemicals Co., Ltd., Tokyo, Japan

[21] Appl. No.: 706,129

[22] Filed: Feb. 27, 1985

[30] Foreign Application Priority Data

Apr. 17, 1984 [JP] Japan .................................. 59-76892

[51] Int. Cl.$^4$ .............................................. E21B 37/06
[52] U.S. Cl. .................................... 166/90; 166/305.1
[58] Field of Search .................. 166/67, 75.1, 90, 304, 166/305.1, 312

[56] References Cited

U.S. PATENT DOCUMENTS

| | | | |
|---|---|---|---|
| 3,830,304 | 8/1974 | Cummits | 166/90 |
| 4,161,504 | 10/1979 | Scott | 166/90 |
| 4,214,628 | 7/1980 | Botts | 166/75.1 |
| 4,393,927 | 7/1983 | Singer | 166/305.1 |
| 4,431,057 | 2/1984 | Colonna et al. | 166/67 |

Primary Examiner—Stephen J. Novosad
Assistant Examiner—William P. Neuder
Attorney, Agent, or Firm—Parkhurst & Oliff

[57] ABSTRACT

A mounting structure for chemical injection tube for a geothermal well which is used to generate power from geothermal energy is provided. A chemical injection tube is wound spirally along the outer surface of a vertical pipe. A double structure of a casing pipe of the geothermal well including the injection tube, which is inserted between the pipes, extends deep in the well below, the flashing point of the well. A plug is inserted at the lower end of the tube. The plug is removed by compressed air or water prior to the injection of scale inhibiting chemicals from the top of the tube. Thus, the chemical injection tube protects the well from the deposition of carbonate scale thereby providing a stable power plant operation.

5 Claims, 5 Drawing Figures

CHEMICAL INJECTION TUBE MOUNTING STRUCTURE FOR GEOTHERMAL WELL

BACKGROUND OF THE INVENTION

The present invention relates to a mounting structure for a chemical injection tube for a geothermal well which is utilized to generate power from geothermal energy. The geothermal energy is contained in hot water and steam.

A considerable amount of alkaline earth metals is dissolved in geothermal fluid which is under high temperature and high pressure subterranean conditions. During fluid flow the alkaline metals tend to deposit onto wall surfaces of the well as carbonates which then adhere to the wall as scale.

The scale causes insufficient fluid production due to its plugging effect and, in extreme cases, the scale can completely close the well.

Furthermore, hot water in a deep subsurface formation can contain salt deposits depending upon the pressure, temperature, ion species ion concentration in the hot water.

There is no known method for providing a chemical injection tube in a geothermal well to prevent carbonate scale adhesion. A chemical injection method is known for hot spring wells. However, hot spring wells are generally so shallow compared to geothermal steam wells (hereafter called "geothermal wells"), that chemicals are injected by hand. Because geothermal wells are often deeper than 1000 m, manual chemical injection is difficult and dangerous due to high pressure hot steam.

It is possible to hang a chemical injection tube below the flashing point in a geothermal well, but the length of such tube can be more than 1000 m. Also, the weight would be 10 to 20 t, so a heavily loaded vertical pipe portion would have to be supported using a permanent hanger structure.

In addition, when the tube extends deep into the well there is a risk of corrosion or erosion, because it is always exposed to geothermal fluid which often includes gravel and dust.

SUMMARY OF THE INVENTION

This invention was developed in view of the foregoing background and to overcome the foregoing drawbacks. Accordingly, it is an object of the present invention to prevent scale from adhering on well walls thereby providing stable power plant operation. It is a further object of the invention to provide a structure for carrying out this method.

This invention relates to a chemical injection tube mounting structure for a geothermal well. The chemical injection tube mounting structure includes a casing pipe formed from double structure of inner and outer casing pipes. An upper portion of the casing pipe rises above the borehole of the geothermal well and the lower portion of the casing pipe is disposed within the geothermal well. A chemical injection tube is wound spirally along the top portion of the inner casing pipe and inserted and secured between the inner casing pipe and the outer casing pipe at a bottom thereof. The end of the chemical injection tube extends into the geothermal well below the flashing point of the well. A hole or port communicating with the chemical injection tube is formed in the wall near the end of the inner casing pipe. A plug is disposed in the hole so that it can be removed by applying pressure into the injection pipe, thereby enabling scale inhibiting chemicals to be injected from the ground directly into the geothermal fluid under the ground through the chemical injecting tube. Thus, to inject chemicals into the well, air or water is charged under pessure into the chemical injection pipe, the plug is removed, and chemicals for preventing scale are directly applied from above the ground to the geothermal fluid under the ground.

The chemical injection pipe according to this invention is preferably an oil well steel pipe such as a tubing pipe or a casing liner. The flashing point is the point at which hot water is partially evaporating because of the decrease of pressure from the saturation pressure of the hot water at that temperature. When the hot water boils at the flashing point, alkaline earth metal ions contained in the hot water precipitate due to the formation of carbonate.

As mentioned above, the lower portion of the injection tube is inserted between two pipes. This forms a double wall structure which is stiffened by cementing the annulus between the pipes. The upper portion of the outer casing therefore does not support the total weight of the injection tube. A support structure, such as a permanent hanger is therefore not necessary.

Also, since there is no exposure to fast flowing hot geothermal fluid, a long service life is expected.

Since a geothermal well is heated by the injection of steam, the casing above the borehole thermally expands axially. The difference in elongation between the casing pipe and the chemical injection pipe can damange the chemical injection pipe.

Such damage does not occur in the structure according to the present invention, because the upper portion of the chemical injection pipe is spirally wound on the upper portion of the inner casing pipe. Thus, even if heat causes the upper portion of the casing pipe to axially expand or contract, the spiral formation absorbs the elongation or contraction and prevents damage.

Since a plug is engaged in advance in the chemical injection hole which is formed in the lower portion of the inner casing pipe, cutting chips are not introduced into the chemical injection tube even when the casing is set or further buried under the geothermal well. Therefore the injection of the chemicals will not be blocked.

When the production phase starts and there is a possibility of scale deposit, the plug is removed by pushing out with compressed air or water and then scale inhibiting chemicals (such as acrylic acids, phosphonic acids, maleic acids etc.) are injected through the nozzle.

Depending upon the well conditions, it may be impossible remove the plug using compressed air or water. To alleviate such a situation, a thin wall jacket may be welded as part of the inner casing pipe near the plug. The thin jacket provides a small hole bored out by a gun perforation.

As described above, according to the present invention, the injection tube, which is inserted in the annulus of the double structure and stiffened by cement, is not exposed to geothermal fluid flowing up through the well bore. Thus there is no corrosion and erosion, and also no tools, such as centralized retaining bolts etc., are needed. An additional advantage is that the upper portion of the casing does not support the total tube weight even when the tube extends below the flashing point of the well, thus eliminating the need for a permanent supporting structure.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

DESCRIPTION OF THE PREFERRED EMBODIMENT

The present invention will be described in detail with reference to the accompanying drawings which illustrate a preferred embodiment according to the present invention. FIGS. 1 to 5 show an example or embodiment according to the present invention which is explained in conjunction with the accompanying drawings.

Figure 1:
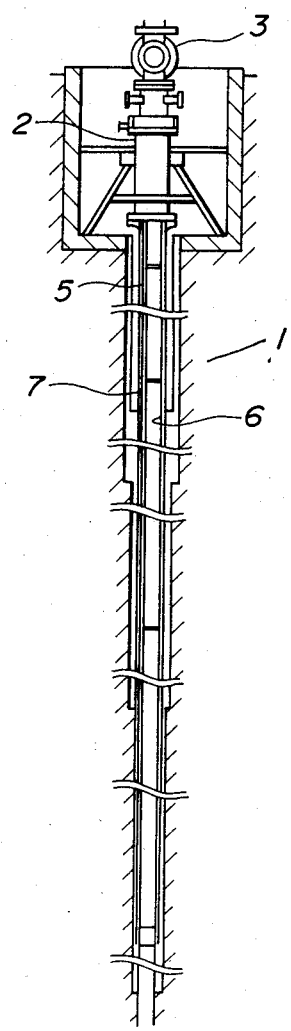
FIG. 1 is a sectional view of a geothermal well.
Figure 2:
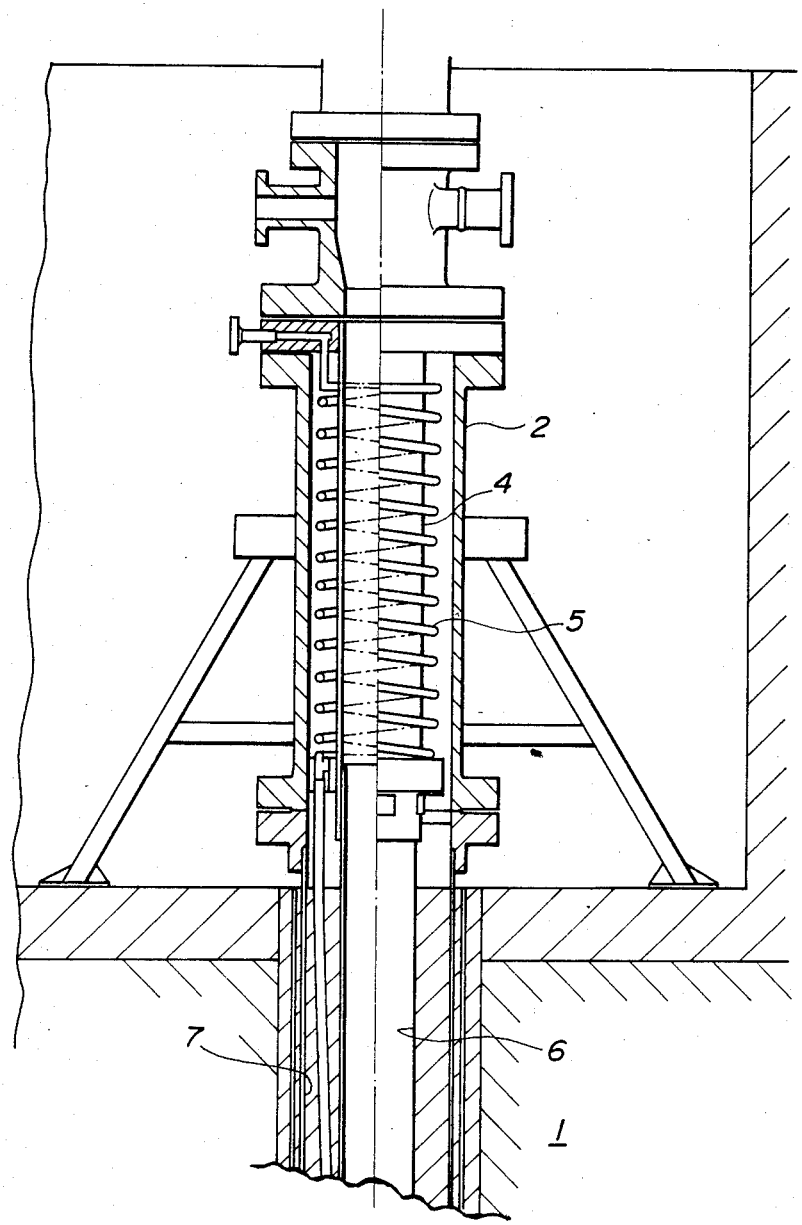
FIG. 2 is a sectional side view of a well head of a geothermal well.

As shown in FIG. 1, a lower portion of a casing pipe, which is formed in a double structure comprising an inner casing pipe 6 and an outer casing pipe 7, is disposed in a geothermal well. The upper portion of the casing pipe projects upwardly from the borehole of the geothermal well. A chemical injection pipe 5 is inserted in the lower portion of the casing pipe between the inner casing pipe 6 and the outer casing pipe 7. The chemical injection pipe 5 extends at its lower end below the flashing point of the well, and is fixed by cementing between the inner and outer casings. The upper portion of the chemical injection pipe 5 is spirally formed, and wound on the upper portion of the inner casing pipe 6. The end of the upper portion of the casing is coupled through main valve 3 with an air feed pipe.

Figure 3:
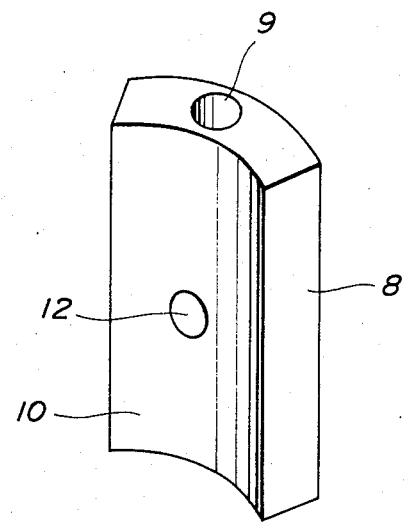
FIG. 3 is a perspective view of an exemplary cover-jacket.
Figure 4:
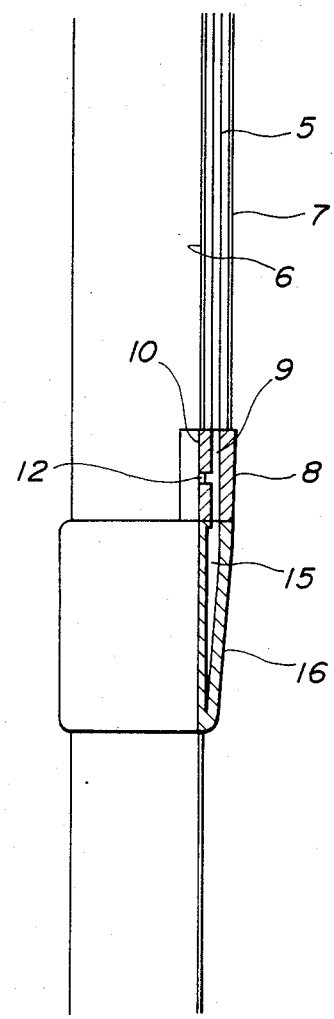
FIG. 4 is a sectional side view of the lower end of an injection tube.
Figure 5:
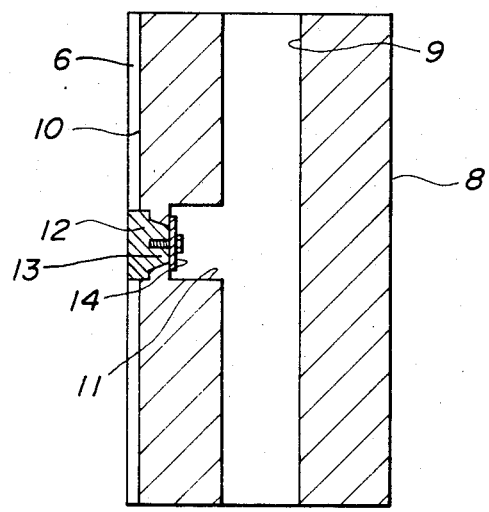
FIG. 5 is a sectional view of an essential part of the cover-jacket.

As shown in FIG. 4, a cover jacket 8 of circular shape as shown in FIG. 3 is located on a portion of the inner casing 6 below the flash point. The lower end of the outer casing pipe 7 if fixed to the outer upper end of the cover jacket 8. The cover jacket 8, as shown in FIG. 5, includes a through hole 9 communicating with the chemical injection pipe 5 perforated therein. A chemical injection hole or port 11 is formed substantially at the center perpendicular to the through hole 9 toward the inside wall surface 10, and a plug 12 is inserted in the hole.

The plug 12 is mounted from the wall surface 10 toward the chemical injection hole 11. The plug 12 has tapered portion 13 and is spirally clamped by a bolt or the like from the interior of the hole 11 by a plate 14. The plug 12 slightly increases in diameter from tapered portion 13 to the portion near the wall 10. The plate 14 is formed so that it will be damaged when air or water is fed under pressure into the hole 9. The plug 12 is removed from the wall surface 10 by the damage to the plate 14.

A gun perforation jacket 16 including a cavity 15 is attached under the cover-jacket 8. The cavity 15 communicates with the injection tube 5 via hole 9 of jacket 8.

During the period before a chemical injection is needed, penetration of geothermal fluid into the tube 5 is blocked by plug 12 which adequately resists the fluid pressure because of the conical shape.

When chemical injection is needed, compressed air or water, introduced from the upper end of tube 5, removes plug 12 by breaking washer plate 14. A manometer on the ground can easily confirm whether plug 12 is removed or not. After such confirmation, chemicals are injected at a given flow rate.

It is possible that it may be very difficult or impossible to remove plug 12 by compressed air or water due to some subsurface condition. In such a case, a small explosion of dynamite, which can be introduced into the well as far down as the gun perforation jacket 16, causes a hole which connects cavity 15 to the geothermal well, thus assuring chemical injection.

While the present invention has been described in its preferred embodiments, it is to be understood that the invention is not limited thereto, and may be otherwise embodied within the scope of the following claims.

What is claimed is:

1. A chemical injection tube mounting structure for a geothermal well comprising:

a casing pipe having an upper portion and a lower portion, said upper portion being disposed vertically and extending upwardly from the geothermal well, said lower portion being disposed within the geothermal well, said casing pipe comprising an inner casing pipe and an outer casing pipe;

a chemical injection tube wound spirally along the inner casing pipe at the upper portion of said casing pipe, said chemical injection tube being secured between the inner casing pipe and the outer casing pipe at the lower portion of said casing pipe, said chemical injection tube having a lower end which extends in the geothermal well below a flashing point; and a chemical injection port formed in said inner casing pipe, said chemical injection port communicating with the lower end of said chemical injection tube, a plug disposed in said port so as to be removed by applying pressure into said chemical injection tube, whereby scale inhibiting chemicals can be injected from the ground directly into the geothermal well through said chemical injecting tube and said chemical injection port.

2. The chemical injection tube mounting structure for a geothermal well according to claim 1, wherein said upper and lower casings are joined integrally in the vicinity of the well head of said casing pipe.

3. The chemical injection tube mounting structure for a geothermal well according to claim 1, in which said plug comprises a body which tapers in diameter toward the inner casing pipe, and a plate engaged inside the inner casing pipe and mounted on the end of the body, said plug functioning to separate from the chemical injection port due to damage to the plate by pressurized air or water.

4. The chemical injection tube mounting structure for a geothermal well according to claim 1, further comprising:

a cover jacket having a through hole communicating with said chemical injection pipe; and a chemical injection bypass hole communicating with said through hole and positioned below said flashing point.

5. The chemical injection tube mounting structure for a geothermal well according to claim 4, further comprising a second cover jacket which includes a cavity which is in communication with the through hole, said second cover jacket being positioned below the first cover jacket, said second cover jacket comprising an inner wall which is capable of being damaged by an explosion of dynamite.

* * * * *